(12) United States Patent
Barakat (10) Patent No.: US 9,223,541 B2
(45) Date of Patent: Dec. 29, 2015

(54) METHOD AND APPARATUS TO ELIMINATE FREQUENCY HOLES IN A MEMORY I/O SYSTEM

(71) Applicant: Shadi Barakat, Foster City, CA (US)

(72) Inventor: Shadi Barakat, Foster City, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 401 days.

(21) Appl. No.: 13/682,487

(22) Filed: Nov. 20, 2012

(65) Prior Publication Data
US 2014/0143585 A1    May 22, 2014

(51) Int. Cl.
*G06F 1/10* (2006.01)
*G06F 5/06* (2006.01)

(52) U.S. Cl.
CPC .... *G06F 5/065* (2013.01); *G06F 1/10* (2013.01); *G06F 2205/067* (2013.01)

(58) Field of Classification Search
CPC ... G06F 1/10; G06F 13/1689; G06F 13/4243; G06F 2217/84; H03L 7/00; H03L 7/0814
See application file for complete search history.

(56) References Cited

U.S. PATENT DOCUMENTS

| | | | |
|---|---|---|---|
| 2007/0036256 A1* | 2/2007 | Yamaguchi et al. | 375/371 |
| 2007/0217559 A1* | 9/2007 | Stott et al. | 375/355 |
| 2008/0301485 A1* | 12/2008 | Rombach et al. | 713/600 |
| 2011/0025389 A1* | 2/2011 | Ma | 327/158 |
| 2011/0249718 A1* | 10/2011 | Zerbe | 375/226 |

OTHER PUBLICATIONS

Wikipedia; *Jitter*; http://en.wikipedia.org/wiki/Jitter; May 21, 2012; pp. 1-7.
Wikipedia; *Phase Noise*; http://en.wikipedia.org/wiki/Phase_noise; Jun. 14, 2012; pp. 1-4.

* cited by examiner

*Primary Examiner* — Dennis M Butler
(74) *Attorney, Agent, or Firm* — Timothy M. Honeycutt (57) ABSTRACT

Various methods and apparatus for managing signals between a processor and a memory device are disclosed. In one aspect, a method of managing signals between a processor and a memory device wherein the processor and the memory device are operatively coupled by a data signal path and a clock signal path is provided. The method includes setting the skew between the data signal path and the clock signal path away from a spectral peak of a phase jitter transfer function.

35 Claims, 5 Drawing Sheets

METHOD AND APPARATUS TO ELIMINATE FREQUENCY HOLES IN A MEMORY I/O SYSTEM

BACKGROUND OF THE INVENTION

1. Field of the Invention

This invention relates generally to computing devices utilizing memory devices and to methods and apparatus for managing signals between memory devices and other devices.

2. Description of the Related Art

Many current computing devices include one or more processors and memory devices that engage in high speed bi-directional communication. Data signals, clock signals and error detection signals represent a few of the types of signals transmitted between these devices. For example, a typical dynamic random access memory (DRAM) device may receive data signals and clock signals from a processor by way of a data bus channel and a clock channel, respectively. Although a processor may include logic that provides synchronous clocking for the data bus channel and the clock channel, some conventional DRAMS tend to introduce skew between the signals received from a processor on the data bus channel and the clock channel. The skew is seldom constant, but instead exhibits phase jitter and/or drift over time and as a function of temperature. If the amount of phase jitter exceeds certain thresholds for a given system, the signal received at the memory device will be flagged as an error, resulting in a so-called "memory operating frequency hole." Memory operating frequency holes can lead to lower device performance or other errors.

One conventional technique to address the issue of phase jitter is to impose sufficient wide band isolation, through silicon design, package design or both, between the processor and the memory device input/outputs (I/Os). This technique tends to be costly. Other conventional techniques involve over or under clocking the processor and/or the memory, which may not be practical for various reasons.

The present invention is directed to overcoming or reducing the effects of one or more of the foregoing disadvantages.

SUMMARY OF EMBODIMENTS OF THE INVENTION

In accordance with one aspect of an embodiment of the present invention, a method of managing signals between a processor and a memory device wherein the processor and the memory device are operatively coupled by a data signal path and a clock signal path is provided. The method includes setting the skew between the data signal path and the clock signal path away from a spectral peak of a phase jitter transfer function.

In accordance with another aspect of an embodiment of the present invention, a method of managing signals between a processor and a memory device of a computing device wherein the processor and the memory device are operatively coupled by a data signal path, a clock signal path and an error detection signal path is provided. The method includes setting the skew between the data signal path and the clock signal path away from a spectral peak of a phase jitter transfer function.

In accordance with another aspect of an embodiment of the present invention, an apparatus is provided that includes a processor and a memory device operatively coupled to the processor by a data signal path and a clock signal path. The processor is operable to set the skew between the data signal path and the clock signal path away from a spectral peak of a phase jitter transfer function.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Various methods of managing signals between a processor and a memory device are disclosed. The processor and the memory device are operatively coupled by a data signal path and a clock signal path. An exemplary method includes setting the skew between the data signal path and the clock signal path away from a spectral peak, and possibly to at least one spectral null, of a phase jitter transfer function. When set to the spectral null, the transmit noise due to phase jitter is attenuated. Additional details will now be described.

Figure 1A:
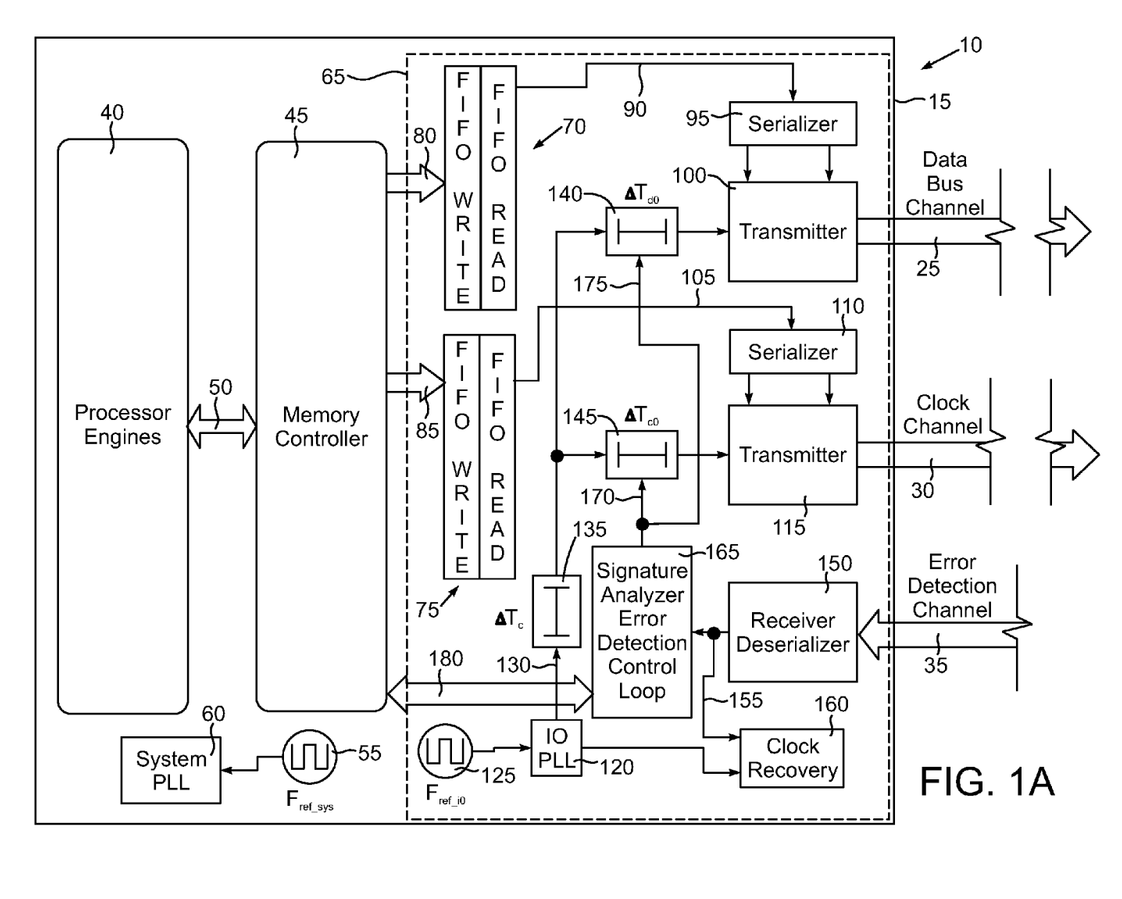
FIGS. 1A and 1B are a block diagram of an exemplary embodiment of a computing device that includes a processor and a memory device.
Figure 1B:
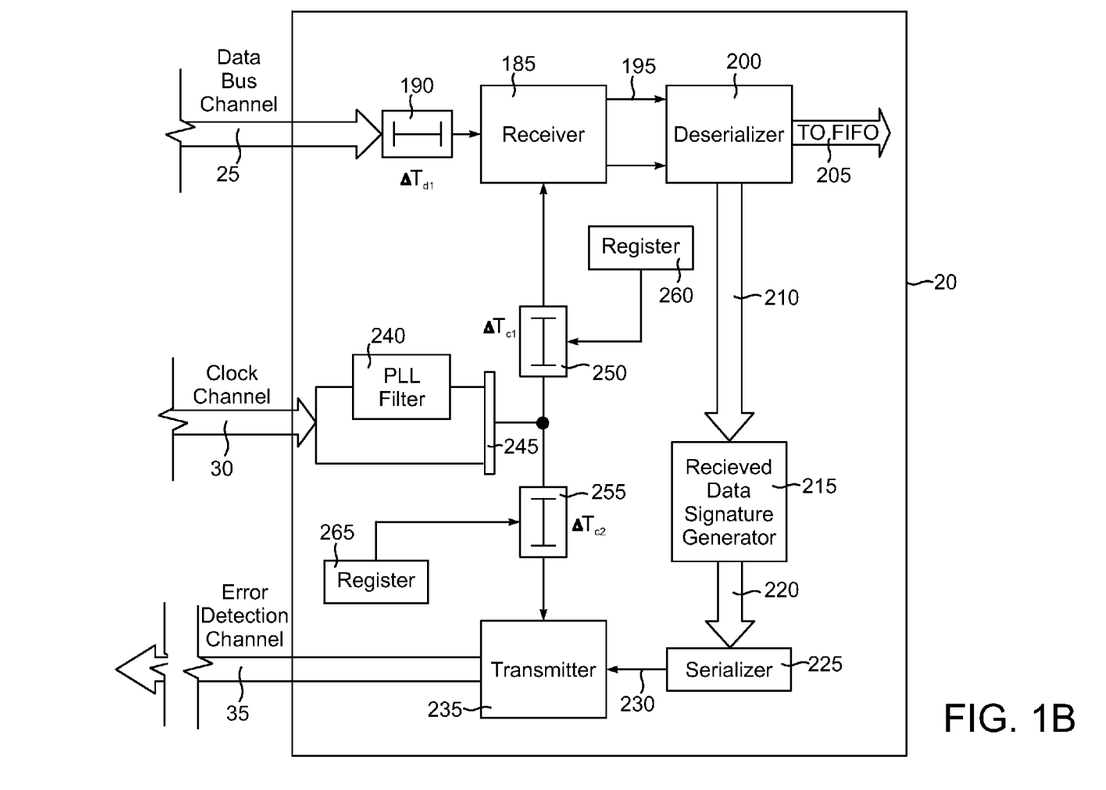

In the drawings described below, reference numerals are generally repeated where identical elements appear in more than one figure. Turning now to the drawings, and in particular to FIG. 1 (FIGS. 1A and 1B) therein is depicted a block diagram of an exemplary embodiment of a computing device 10 that includes a processor 15 and a memory device 20. The computing device 10 may be a computer, a digital television, a handheld mobile device, a personal computer, a server, a memory device, an add-in board such as a graphics card, or any other computing device employing semiconductors. The processor 15 may be a microprocessor, a graphics processor, a combined microprocessor/graphic processor, an application specific integrated circuit, a communications device or other. The memory device 20 may be a random access memory or other type of memory device.

The processor 15 is linked electrically or optically to the memory device 20 by a data bus channel 25, a clock channel 30 and an error detection channel 35. The data bus channel 25 and the clock channel 30 are operable to deliver data and clock signals from the processor 15 to the memory device 20 and the error detection channel 35 is operable to deliver error detection signals from the memory device 20 to the processor 15. In this illustrative embodiment, it is assumed that the processor 15 is a graphics processor that includes processor engines 40 and a memory controller 45. The processor engines 40 and the memory controller 45 are linked by a multi-channel bus 50. A system level clocking function is provided by an oscillator 55 and a system phase lock loop (PLL) 60. The oscillator 55 is operable to deliver some oscillating signal with a frequency $F_{REF\text{-}SYS}$. The processor 15 includes a physical device layer (PHY) 65. The PHY 65 includes a FIFO read and write block 70 associated with the data bus channel 25 and FIFO read and write block 75 associated with the clock channel 30. The FIFO read/write block 70 is linked to the memory controller 45 by a bus 80 and the FIFO read and write block 75 is linked to the memory controller 45 by way of another bus 85. The output 90 of the FIFO read and write block 70 is tied to a serializer 95. The serializer 95 is, in-turn, linked to a transmitter 100 associated with the data bus channel 25. The FIFO read and write block 75 similarly has an output 105 that is tied to another serializer 110 that, in-turn, feeds a transmitter 115 associated with the clock channel 30. The PHY layer 65 includes an I/O PLL 120 that is fed by an oscillator 125 supplying some frequency $F_{REF\_I/O}$. The output 130 of the I/O PLL 120 is fed to the transmitters 100 and 115. There is a delay element 135 associated with the pathway from the I/O PLL 120 that has some delay value $\Delta T_c$. In addition, there are delay elements 140 and 145 associated with the pathways to the transmitters 100 and 115 respectively. The delay element 140 has some delay value $\Delta T_{d0}$ and the delay element 145 has some delay value $\Delta T_{c0}$. As described in more detail below, the values of $\Delta T_{d0}$ and $\Delta T_{c0}$ may be modified selectively in order to correlate the phase noise associated with the data bus channel 25 and the clock channel 30. The delay elements 140 and 145 may be implemented in a variety ways, such integrated circuits, a combination of plural inverters and a multiplexer or other circuitry that provides selectable time delay.

The error detection channel 35 is connected to a receiver deserializer 150 that provides an input 155 to clock recovery logic 160 and another input to a signature analyzer error detection control loop 165. The error detection control loop 165 provides output signals at 170 and 175 that can modify the values $\Delta T_{d0}$ and $\Delta T_{d0}$ to be described in more detail below. The error detection control loop 165 is tied electrically to the memory controller 45 by way of a bus 180.

The data bus channel 25 is connected to a receiver 185 in the memory device 20. There is a delay element 190 with a value $\Delta T_{d1}$ that is associated with the input from the data bus channel 25 to the receiver 185. The output 195 of the receiver is tied to a deserializer 200. The output 205 of the deserializer 200 is delivered to TO FIFO logic of the memory device 20. In addition, the deserializer provides output data on a data bus 210 that is used by a received data signature generator 215, which is designed to facilitate send and received data comparison for error detection purposes. The output 220 of the received data signature generator 215 is tied to a serializer 225. The output of the serializer 230 is tied to a transmitter 235 that is connected to the error detection channel 35.

The clock channel 30 is connected to a PLL filter 240 and in parallel to a multiplexer 245. The output of the PLL filter 240 is similarly tied to the multiplexer 245. The output of the multiplexer 245 has associated with it respective delay elements 250 and 255 that have respective delay values $\Delta T_{c1}$ and $\Delta T_{c2}$. These delay values $\Delta T_{c1}$ and $\Delta T_{c2}$ are configurable by way of registers 260 and 265. In this way, clock signals from the clock channel 30 may be delivered to the receiver 185 and the transmitter 235 with some selected delays $\Delta T_{c1}$ and $\Delta T_{c2}$.

Figure 2:
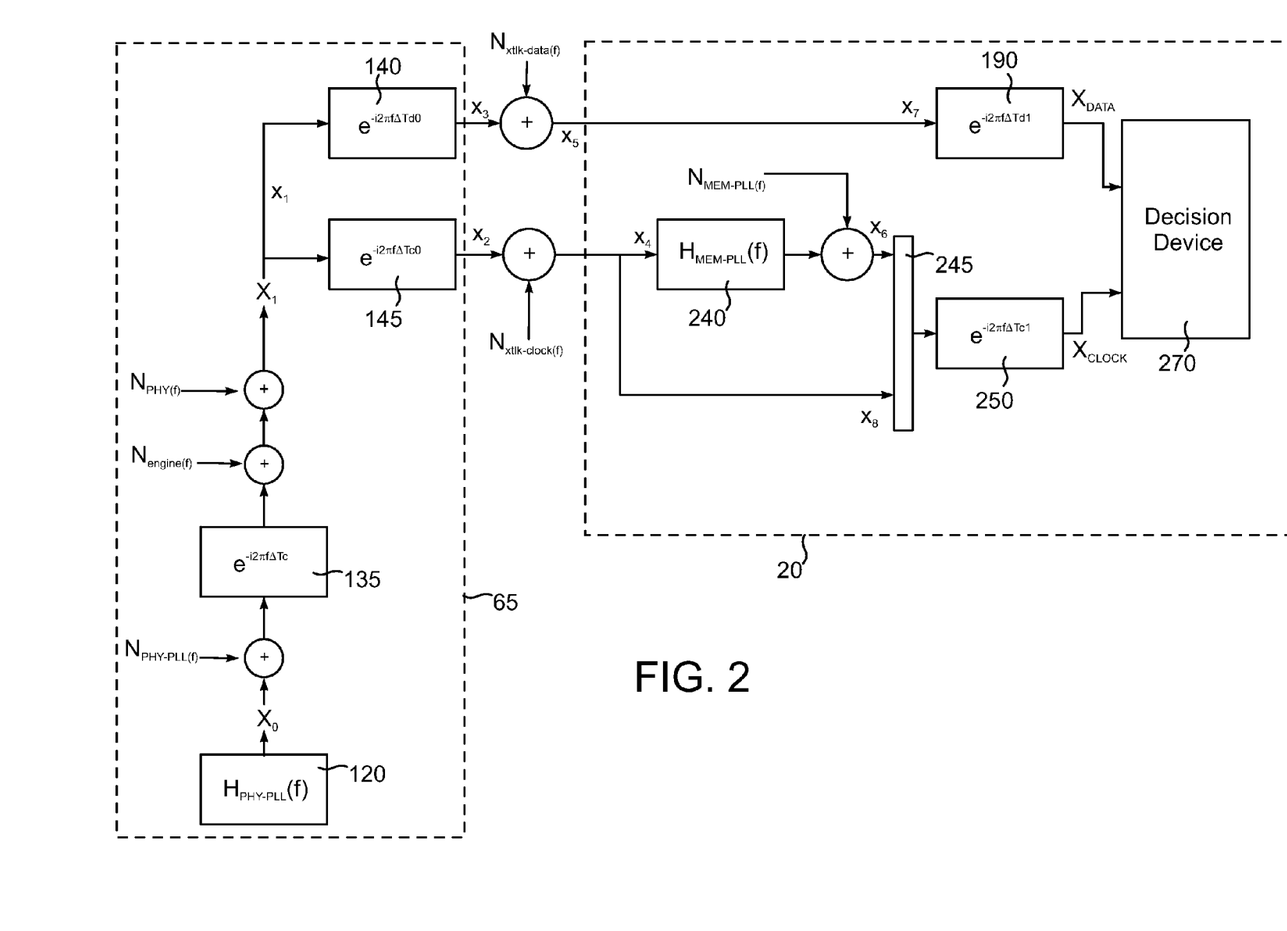
FIG. 2 is a system model diagram for an exemplary physical layer portion of the processor and the memory device.

A system model diagram for the physical layer 65 and the memory device 20 is depicted in FIG. 2. The block $H_{PHY-PLL(f)}$ corresponds to the I/O PLL 120 shown in FIG. 1A. The output of the I/O PLL 120 (also shown in FIG. 1A) and designated as block $H_{PHY-PLL(f)}$ in FIG. 2 is a signal $X_0$. There are several sources of noise that interact with the $X_0$ signal. The first of these is the noise $N_{PHY-PLL(F)}$, which is associated with the I/O PLL 120 shown in FIG. 1A. In addition, there is a phase shift associated with the delay element 135 that has a value $e^{-i2\pi f \Delta Tc}$. Next, there is a noise signal $N_{engine(f)}$ that is associated with the processor engines 40 depicted in FIG. 1A and there is a noise component $N_{PHY(f)}$ associated with the physical device layer 65 itself shown in FIG. 1A. The signal $X_1$ is the combination of the $X_0$ signal and the noise components $N_{PHY-PLL(f)}$, $N_{engine(f)}$ and $N_{PHY(f)}$ and the phase shift $e^{-i2\pi f \Delta Tc}$ delivered commonly to the delay elements 140 and 145 at node x1. The phase shift associated with the delay element 140 shown in FIG. 1A and thus the transmitter 100 is given by $e^{-i2\pi \Delta Td0}$ and the phase shift associated with the delay element 145 and thus the transmitter 115 shown at FIG. 1A is given by $e^{-i2\pi f \Delta Tc0}$. Node x2 has a crosstalk noise input $N_{xtlk-clock(f)}$ resulting in output at node x4 and node x3 has a crosstalk noise input $N_{xtlk-data(f)}$ resulting in output at node x5. As described below, these crosstalk inputs $N_{xtlk-clock(f)}$ and $N_{xtlk-data(f)}$ will be ignored for computational purposes.

Turning now to the memory device 20, the combined $X_1$ and $e^{-i2\pi f \Delta Tc0}$ signal is delivered to the PLL filter 240 at node x4 and to node x8, which is a bypass of the PLL filter 240 leading to a multiplexer 245. As described below, the x8 node will be used for system modeling. The output signal of the PLL filter 240 (alternatively labeled $H_{MEM-PLL(f)}$ has some crosstalk noise $N_{MEM-PLL(f)}$ component associated with it and thus the combination of the two is delivered to the multiplexer 245 at node x6. The output of the multiplexer 245 has some phase shift component $e^{-i2\pi f \Delta Tc1}$ associated with the delay element 250. The delay element 190 introduces some time phase shift component of $e^{-i2\pi f \Delta Td1}$. Taking into account the phase shifts contributions of the delay elements 190 and 250, outputs $X_{DATA}$ and $X_{CLOCK}$ are delivered to a decision device 270. The output of the decision device 270 is some hard decision such as a read or write decision. The decision device 270 may be a flip-flop, a comparator, or an integrated circuitry capable of sampling incoming data with clock and determining the data type, i.e. ones or zeroes for binary encoding or other other values for other encoding schemes.

To simplify the theoretical analysis, the following reductions and simplifications will be made:

1. The system illustrated in the FIG. 2 block diagram uses source synchronous clocking for data transfer to the memory device. Noise analysis can start from the common source between the clock and the data path at node x1. All noise sources and contribution before node x1 are assumed to be common and correlated between the clock and the data paths;
2. Noise margin at the sampling device is the difference (given by a difference function to be defined below) between the data path and clock path phase noise processes. Static phase de-skewing will be assumed to have taken place at time t=0 such that the noise analysis described herein is initiated at time t≥0;
3. The DRAM data pin insertion delay is negligible such that $\Delta T_{d1}=0$;
4. The DRAM clock pin insertion delay is dominant such that $\Delta T_{c1}>>\Delta T_{d1}$ and $\Delta T_{c1}=\Delta T_{DRAM}$;
5. The PHY layer 65 clock tree is designed and constructed such that $\Delta T_{d0}=\Delta T_{d0}=\Delta T_{phy}$;
6. The PLL 240 of the memory device 20 is bypassed. The system modeling will use the x8 node in the system model block diagram of FIG. 2; and
7. System noise budget is not crosstalk dominated such that:

$$N_{xtlk-data}(f) \cong 0 \forall f \in [0, \infty] \quad (1)$$

and $$N_{xtlk-clock}(f) \cong 0 \forall f \in [0, \infty] \quad (2)$$

Therefore, crosstalk may be neglected. Under these assumptions, the phase noise at node x1 associated with the data channel 25 is given by:

$$X_{data}(f) = X_1 \times e^{-2\pi f \Delta TPHY} \quad (3)$$

and the phase noise at node x1 associated with the clock channel 30 is given by:

$$X_{clock}(f) = X_1 \times e^{-i2\pi f \Delta T_{DRAM}} \times e^{-i2\pi f \Delta T_{PHY}} \quad (4)$$

The difference function S(f) for Equations (3) and (4) is given by:

$$S(f) = X_{data}(f) - X_{clock}(f) = X_1 \times e^{-i2\pi f \Delta T_{PHY}} \times [1 - e^{-i2\pi f \Delta T_{DRAM}}] \quad (5)$$

The magnitude of the difference function S(f) is given by:

$$|S(f)|^2 = S(f) \times S^*(f) = T(f) \quad (6)$$

where S*(f) denotes the conjugate function of S(f). Substituting, T(f) is given by:

$$T(f) = |X_1|^2 \times [1 - e^{-i2\pi f \Delta T_{DRAM}}] \times [1 - e^{i2\pi f \Delta T_{DRAM}}] \quad (7)$$

Equation (7) can be further simplified by defining a variable $\phi$ as:

$$\phi = f \times \Delta T_{DRAM} \quad (8)$$

then normalizing by:

$$2|X_1|^2$$

and using trigonometric identities to convert T(f) to:

$$T(\phi) = 1 - \cos(2\pi\phi) \quad (9)$$

Figure 3:
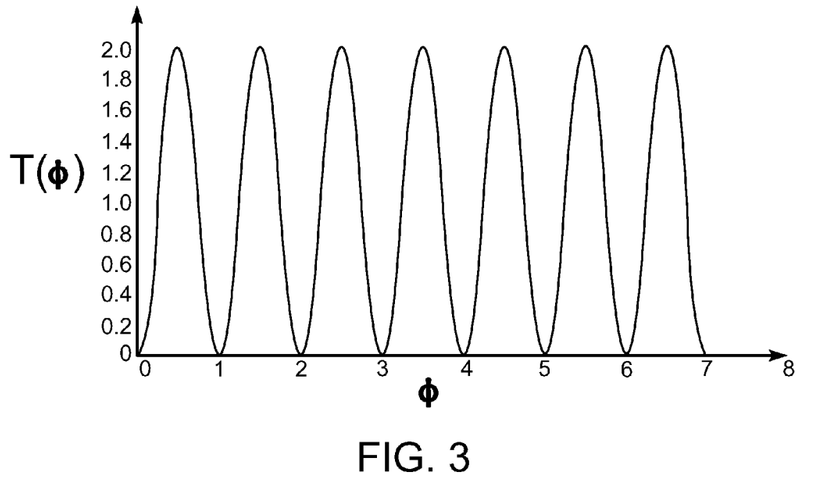
FIG. 3 is a graph of an exemplary transfer function representing phase jitter between clock and data signal paths of the processor and the memory device.

Equation (9) shows that the noise margin of the memory system at the sampling/decision device 270 (in the memory device 20) exhibits spectral nulls and peaks as a function of $\phi$. The timing skew between the clock and the data paths leads to periodic nulls and peaks of the transmit noise $X_1$ as shown in FIG. 3. If:

$$\phi = n \quad (10)$$

where n is a positive integer, then $T(\phi)=0$, i.e., a spectral null for noise transfer results, the phase noise between clock and data are correlated, and there is noise cancellation and maximum noise margin at the sampling device. However, if:

$$\phi = \frac{2n+1}{2} \quad (11)$$

where n is a positive integer, then $T(\phi)=2$, i.e, a spectral peak for noise transfer results where the data and clock noise components have opposite phases, which gives minimum noise margin at the noise sampling device. The noise is doubled.

For memory-engine system analysis, it is useful to express $T(\phi)$ as a function of system variables, such as the memory I/O bit rate BR, as follows:

$$\phi = f \times \Delta T_{DRAM} = f \times \frac{\alpha}{BR} \quad (12)$$

Equation (12) expresses the DRAM clock tree delay, $\Delta T_{DRAM}$, as a multiple a of the symbol duration or unit interval given by:

$$\text{Unit Interval} = \frac{1}{BR} \quad (13)$$

For example, a bit rate of 1.0 GB/s yields a symbol duration or unit interval of $10^{-9}$ seconds. Reexpressing $T(\phi)$ as a function of frequency leads to the following:

$$T(\alpha) = 1 - \cos\left(\frac{2\pi \alpha \times f}{BR}\right) \quad (14)$$

From Equation (14), the frequencies at which the spectral nulls and peaks occur can be expressed as a function of $\alpha$ and BR. Other metrics, such as baud rate, other parameters could be used. Equation (14) shows that for very small timing skews, i.e. $\alpha \approx 0$, there is complete correlation and the transmit noise is attenuated at all frequencies. Some memory systems, such as GDDR5 DRAM's, may not exhibit low timing skew. Instead the clock-data insertion skew is typically on the order of a couple of nano seconds and varies from one DRAM vendor to another.

For a GPU processing system, performance requirements can be translated into independent engine and memory clock requirements. As an example, in an AMD discrete graphics GPU system, the memory I/O bit rate can be 6.0 Gbps, which yields a BR value of 6.0 GHz. The engine clock is operating at 1.0 GHz. This is an optimum configuration that leads to a balanced memory-engine system where both engine/memory performance and power are optimized.

A non-balanced processing system can arise when the engine noise spurs inject themselves (additive noise process $N_{engine(f)}$ in FIG. 2) on the PHY transmit path. To illustrate this, assume a single engine noise frequency component at 1.0 GHz. Neglecting all other noise sources, $X_1(f)$ is an impulse function where:

$$X_1(f) = 0 \forall f \neq 1 \text{GHz} \quad (15)$$

Using Equation (14), $\alpha=3$, f=1.0 GHz, and BR=6, it is apparent that noise amplification and doubling occurs. In this scenario the I/O noise budget is not met and the system will likely not meet the bit error specification, resulting in compulsory diagnostics and real application failures. It may be technically difficult and cost prohibitive to introduce sufficient wide band isolation between engine and I/O through package or silicon design, and altering memory or engine frequency to avoid the spectral peaks may result in an imbalanced processing system and sacrifice system power and/or performance. For example if its required that the noise transfer be reduced by ⅓ of its peak value to meet the I/O budget, raising the engine frequency by ⅓ to 1.33 GHz would be required under the model presented above. This last scenario is not practical in a real system. The better alternative would be to fix the engine and memory clock requirements needed for the balanced system and adjust the variable a as set forth in the exemplary embodiments described herein.

Also, the analysis presented above is done for the transmit system. A similar analysis can be extended to a GDDR5 or other type of memory system receiver system where jitter amplification impacts the clock and data recovery receive (CDR) budget and lead to excessive noise outside the band that the CDR tracks.

Equations (9) and (14) show that it is possible to use hardware and algorithms to minimize the phase jitter transfer at the sampling device of the DRAM write path by training or locking the skew between the clock and data paths to the spectral nulls (i.e., $T(\phi)=0$ or $T(\alpha)=0$) of the phase jitter transfer function. In an exemplary embodiment, the hardware may be a variable delay element in the data and/or clock path on the PHY or DRAM side of the link. For example, the delay $\Delta T_{DRAM}$ of the delay elements 140 and 145 may be modified as necessary and repeatedly to aim for minimized slew between the clock and data channels 25 and 30 in FIG. 1. These delay elements 140 and 145 can be assumed to have upper bounds on their intrinsic noise magnitude and that the noise magnitude is independent of the delay value. Nulling the transmit jitter is achieved by adjusting the relative values of the delays $\Delta T_{d0}$ and $\Delta T_0$ in FIGS. 1 and 2 associated with the delay elements 140 and 145. This adjustment can be part of a close loop adaptation loop implementing a least mean squares type algorithm. The performance surface can be derived from the retry and/or error detection code metrics of a GDDR5 or other type of memory system. Thus, the error detection channel 35 and the signature analyzer error detection control loop 165 can deliver control signals via inputs 170 and 175 to the variable delay elements 145 and 140, respectively. It should be understood that an optimum value for the selected skew the skew between the clock and data paths need not correspond exactly to the spectral nulls (i.e.,) $T(\phi)=0$ or $T(\alpha)=0$). It may be desirable to lock the skew between the clock and data paths to values away from the spectral peaks (i.e., away from $T(\phi)=2$ or $T(\alpha)=2$ in FIG. 3) of the phase jitter transfer function, again by selectively setting the delay $\Delta T_{DRAM}$ of the delay elements 140 and 145, and achieve beneficial performance.

Figure 4:
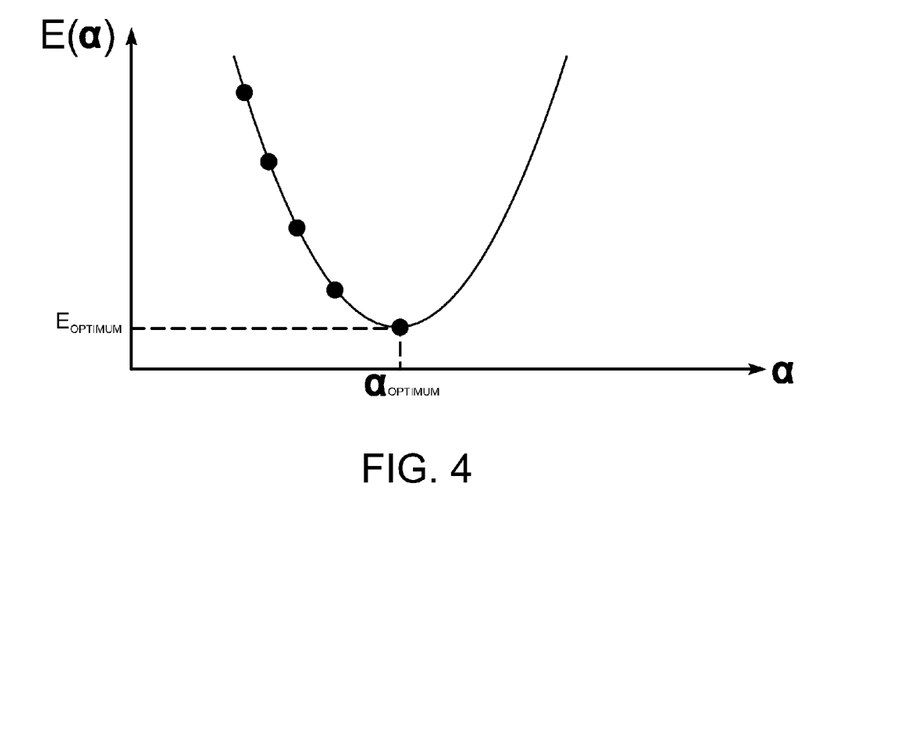
FIG. 4 is a graph of an exemplary performance phase jitter optimization algorithm curve.

There are many possible variants of an algorithm that may be used to converge and track an optimum value for the transmit jitter, which is preferably away from a spectral peak and may be a null. In one exemplary embodiment, a search algorithm can be used to descend a performance curve and find the optimum delay value. It will be useful to define a new function $E(\alpha)$ proportional to the jitter transfer function $T(\alpha)$ such that:

$$E(\alpha) \propto T(\alpha) \quad (16)$$

where $E(\alpha)$ can represent any function that has a one-to-one and monotonic mapping to $T(\alpha)$. Examples include bit error rate and edge jitter at the decision device. The task of the search algorithm is to converge to a minimum value of $E(\alpha)$. Since the performance curve (see the curve shown in FIG. 3) exhibits multiple minima, it is possible for the algorithm to converge on any of these. An efficient hardware implementation would seek to minimize the maximum delay of the tuning element. This minimization allows for optimum area, power, and jitter metrics. For simplicity in the algorithm description a single minimum search algorithm is assumed (it is possible to expand the steps in this algorithm to perform a multiple minima search, followed by a decision function on which one to choose for functional mode operation, based for example on an a priori known and monotonic power function vs. delay value). FIG. 4 depicts one possible traversal of the performance curve in search of the optimum delay tuple, ($\alpha_{OPTIMUM}$, $E_{OPTIMUM}$). Once the optimum value ($\alpha_{OPTIMUM}$, $E_{OPTIMUM}$) is found, there is a need to track its trajectory in time as a function of time variant system parameters such as temperature, voltage, and other electrical parameters. To ensure an optimum value is maintained the search described above can be performed periodically. The periodic interval to perform this search would be chosen based on system tolerances and dynamics. For example, the thermal time constant of the system and the temperature sensitivity of the various delay paths result in drift in the optimum value. The periodic interval would be chosen to keep this drift within the system operating budget. In addition to system dynamics, the search can be performed during lulls in the bus activity. Under this algorithm, there is no closed loop tracking. It may be termed an open loop periodic retrain scheme. Note that FIG. 4 represents and idealized situation. Actual curves may have multiple local minima and maxima.

Figure 5:
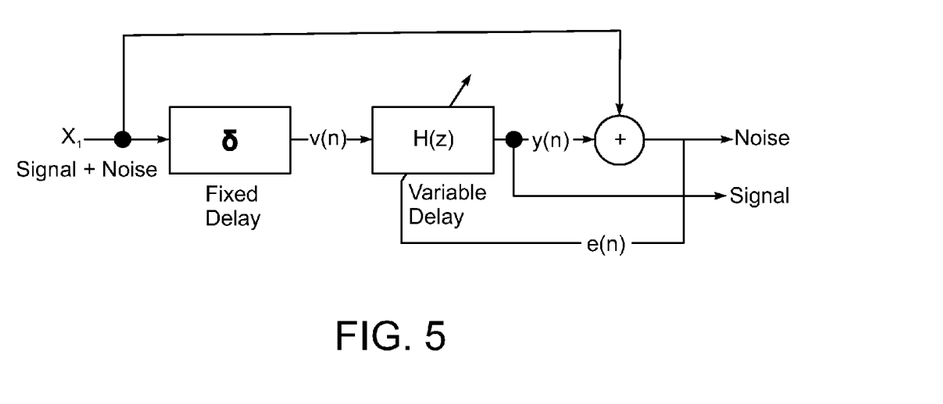
FIG. 5 is a simplified depiction of the exemplary system model diagram of FIG. 2.

In another exemplary embodiment, an alternative algorithm replaces and complements the search algorithm just described. This alternative algorithm can be used for closed loop tracking, after an optimum value is found under the previously-described algorithm, or it can be used to achieve both convergence and tracking simultaneously. The algorithm is presented in the discrete time domain. A continuous time version also applies and can be implemented. FIG. 5 shows a further simplified representation of the system model presented in FIG. 2. The same assumptions used to derive Equation (14) are made in this simplified diagram. The fixed delay component between the data path and the clock path is represented by $\delta$ in FIG. 5, while the variable delay component is represented by the filter transfer function $H(z)$. In the previous analysis, $H(z)$ was assumed to be a variable delay element that introduces further delay between the clock and data paths. For the more general case where the noise component is of a broadband nature, $H(z)$ will be a more generalized filter structure with filter coefficient $\alpha$. Referring to FIG. 5, the error signal $e(n)$ is defined as:

$$e(n)=X_1(n)-y(n) \quad (17)$$

Using this error signal $e(n)$, the jitter transfer optimization can be performed with the following steepest descent algorithm:

1. Change the coefficient in the filter $H(z)$ in and check whether the power of the error signal increased or decreased.
2. If it decreased, go on to the next coefficient value.
3. If it increased, switch the sign of the coefficient change and go on to the next coefficient value.
4. Repeat this procedure until the error signal $e(n)$ is minimized.

A faster and more accurate version of the steepest descent algorithm that is also simpler to implement is the least mean square (LMS) algorithm. The LMS simplified version of the gradient descent algorithm can be derived and is given by:

$$\alpha[n+1]=\alpha[n]+2\times\mu\times e[n]\times\Phi[n] \quad *18)$$

Where $\mu$ is the tracking/adaptation parameter. It can be a constant or time variant. $\Phi[n]$ is a gradient signal of the parameter $\alpha$, i.e.:

$$\Phi[n] = \frac{\partial y(n)}{\partial \alpha} \quad (19)$$

The algorithm can be initiated with $\alpha[0]=\alpha_{OPTIMUM}$ if available or an arbitrary value if the optimum value is not. Other simplified variants of this LMS algorithm can be used, such as the sign-data LMS, sign-error LMS, and sign-sign LMS. In addition to these exemplary algorithms, other training and tracking/adaptation algorithms can be used. These other alternative algorithms should include traps for outlier conditions to account for limitations in the system parameters such as a finite delay tuning range, and limitation of the physical implementation of any filter structure.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of managing signals between a processor and a memory device, the processor and the memory device operatively coupled by a data signal path and a clock signal path, comprising:

setting the skew between the data signal path and the clock signal path away from a spectral peak of a phase jitter transfer function, the phase jitter transfer function characterizing phase jitter between the data signal path and the clock signal due to processor induced noise, the skew setting being independent of a read/write or power state of the memory device.

2. The method of claim 1, wherein at least one of the data signal pathway and the clock signal pathway includes a delay element with a variable delay, the setting the skew comprising setting the delay of the delay element to set the skew between the data signal path and the clock signal path away from the spectral peak of the phase jitter transfer function.

3. The method of claim 2, wherein the phase jitter transfer function comprises $T(\phi)=1-\cos(2\pi\phi)$ where $\phi=f\times\Delta T_{DRAM}$, f is the clock frequency and $\Delta T_{DRAM}$ is the set delay.

4. The method of claim 2, wherein the phase jitter transfer function comprises $$T(\alpha) = 1 - \cos\left(\frac{2\pi\alpha \times f}{BR}\right)$$

where BR is the bit rate of the memory device, f is the clock frequency, $\alpha$ is a parameter defined by $BR\times\Delta T_{DRAM}$, and $\Delta T_{DRAM}$ is the set delay.

5. The method of claim 2, wherein the delay element comprises part of the processor.

6. The method of claim 2, wherein the delay element comprises part of the memory device.

7. The method of claim 2, wherein the at least one of the data signal pathway and the clock signal pathway includes an additional delay element with a variable delay, the additional delay element being part of the processor or the memory device, the setting the skew comprising setting the delay of the delay element and the additional delay element to set the skew between the data signal path and the clock signal path away from the spectral peak of the phase jitter transfer function.

8. The method of claim 1, wherein the setting comprises using an algorithm to converge on a minimum value of a parameter representative of a point away from the spectral peak.

9. The method of claim 8, wherein the parameter comprises bit error rate or edge jitter.

10. The method of claim 1, wherein the skew is sensed by error detection logic of the memory device, the error detection logic being operable to inform an error detection control loop of the processor of the skew.

11. The method of claim 1, wherein the processor and the memory device comprise components of a computing device.

12. The method of claim 1, comprising setting the skew between the data signal path and the clock signal path to at least one spectral null of the phase jitter transfer function.

13. A method of managing signals between a processor and a memory device of a computing device, the processor and the memory device operatively coupled by a data signal path, a clock signal path and an error detection signal path, comprising:

setting the skew between the data signal path and the clock signal path away from a spectral peak of a phase jitter transfer function, the phase jitter transfer function characterizing phase jitter between the data signal path and the clock signal due to processor induced noise, the skew setting being independent of a read/write or power state of the memory device.

14. The method of claim 13, wherein at least one of the data signal pathway and the clock signal pathway includes a delay element with a variable delay, the setting the skew comprising setting the delay of the delay element to set the skew between the data signal path and the clock signal path away from the spectral peak of the phase jitter transfer function.

15. The method of claim 14, wherein the phase jitter transfer function comprises $T(\phi)=1-\cos(2\pi\phi)$ where $\phi=f\times\Delta T_{DRAM}$, f is the clock frequency and $\Delta T_{DRAM}$ is the set delay.

16. The method of claim 14, wherein the transfer function comprises $$T(\alpha) = 1 - \cos\left(\frac{2\pi\alpha \times f}{BR}\right)$$

where BR is the bit rate of the memory device, f is the clock frequency, $\alpha$ is a parameter defined by $BR\times\Delta T_{DRAM}$, and $\Delta T_{DRAM}$ is the set delay.

17. The method of claim 14, wherein the delay element comprises part of the processor.

18. The method of claim 14, wherein the delay element comprises part of the memory device.

19. The method of claim 14, wherein the at least one of the data signal pathway and the clock signal pathway includes an additional delay element with a variable delay, the additional delay element being part of the processor or the memory device, the setting the skew comprising setting the delay of the delay element and the additional delay element to set the skew between the data signal path and the clock signal path away from the spectral peak of the phase jitter transfer function.

20. The method of claim 13, wherein the setting comprises using an algorithm to converge on a minimum value of a parameter representative of a point away from the spectral peak.

21. The method of claim 20, wherein the parameter comprises bit error rate or edge jitter.

22. The method of claim 13, wherein the skew is sensed by error detection logic of the memory device, the error detection logic being operable to inform an error detection control loop of the processor of the skew by a signal on the error detection signal path.

23. The method of claim 13, comprising setting the skew between the data signal path and the clock signal path to at least one spectral null of the phase jitter transfer function.

24. An apparatus, comprising:
a processor;
a memory device operatively coupled to the processor by a data signal path and a clock signal path; and
wherein the processor is operable to set the skew between the data signal path and the clock signal path away from a spectral peak of a phase jitter transfer function, the phase jitter transfer function characterizing phase jitter between the data signal path and the clock signal due to processor induced noise, the skew setting being independent of a read/write or power state of the memory device.

25. The apparatus of claim 24, wherein at least one of the data signal pathway and the clock signal pathway includes a delay element with a variable delay, the processor being operable to set the skew by setting the delay of the delay element to set the skew between the data signal path and the clock signal path away from a spectral peak of the phase jitter transfer function.

26. The apparatus of claim 25, wherein the phase jitter transfer function comprises $T(\phi)=1-\cos(2\pi\phi)$
where $\phi = f \times \Delta T_{DRAM}$, f is the clock frequency and $\Delta T_{DRAM}$ is the set delay.

27. The apparatus of claim 25, wherein the transfer function comprises $$T(\alpha) = 1 - \cos\left(\frac{2\pi\alpha \times f}{BR}\right)$$

where BR is the bit rate of the memory device, f is the clock frequency, $\alpha$ is a parameter defined by $BR \times \Delta T_{DRAM}$, and $\Delta T_{DRAM}$ is the set delay.

28. The apparatus of claim 25, wherein the delay element comprises part of the processor.

29. The apparatus of claim 25, wherein the delay element comprises part of the memory device.

30. The apparatus of claim 25, wherein the at least one of the data signal pathway and the clock signal pathway includes an additional delay element with a variable delay, the additional delay element being part of the processor or the memory device.

31. The apparatus of claim 25, wherein the processor is operable to execute code to implement an algorithm to converge on a minimum value of a parameter representative of a point away from the a spectral peak.

32. The apparatus of claim 31, wherein the parameter comprises bit error rate or edge jitter.

33. The apparatus of claim 24, wherein the processor and the memory device are operatively coupled by an error detection signal path, the processor comprises an error detection control loop, the memory device comprises error detection logic operable to sense the skew and inform the error detection control loop of the skew by way of the error detection signal path.

34. The apparatus of claim 24, wherein the processor and the memory device comprise a computing device.

35. The apparatus of claim 24, wherein the processor is operable to set the skew between the data signal path and the clock signal path to a spectral null of the phase jitter transfer function.

\* \* \* \* \*